US006254905B1

(12) United States Patent
Hojo et al.

(10) Patent No.: US 6,254,905 B1
(45) Date of Patent: Jul. 3, 2001

(54) FOOD ADDITIVE SLURRY OR POWDER COMPOSITION AND FOOD COMPOSITION CONTAINING SAME AND METHOD OF MAKING

(75) Inventors: Hisakazu Hojo; Naoki Kubota; Shiro Minayoshi, all of Hyogo (JP)

(73) Assignee: Maruo Calcium Company Limited, Akashi (JP)

( * ) Notice: Subject to any disclaimer, the term of this patent is extended or adjusted under 35 U.S.C. 154(b) by 0 days.

(21) Appl. No.: 09/404,875

(22) Filed: Sep. 24, 1999

(51) Int. Cl.[7] .............................. A23L 1/304; A23L 1/05
(52) U.S. Cl. ...................... 426/74; 426/506; 426/518; 426/573; 426/648
(58) Field of Search ............................. 426/74, 648, 573, 426/506, 518

(56) References Cited

U.S. PATENT DOCUMENTS

| | | | |
|---|---|---|---|
| 4,851,243 | * | 7/1989 | Andersen et al. ............ 426/74 |
| 5,609,897 | * | 3/1997 | Chandler et al. ............ 426/74 |
| 5,820,903 | * | 10/1998 | Fleury et al. ............ 426/74 |
| 5,855,936 | * | 1/1999 | Reddy et al. ............ 426/74 |

FOREIGN PATENT DOCUMENTS

| | | |
|---|---|---|
| 57-110167 | 7/1982 | (JP) . |
| 6-125741 | 5/1994 | (JP) . |
| 6-127909 | 5/1994 | (JP) . |
| 6-197736 | 7/1994 | (JP) . |
| 9-47269 | 2/1997 | (JP) . |
| WO96/13176 | 5/1996 | (WO) . |

* cited by examiner

*Primary Examiner*—Helen Pratt
(74) *Attorney, Agent, or Firm*—Armstrong, Westerman, Hattori, McLeland & Naughton, LLP

(57) ABSTRACT

A food additive slurry or powder composition which comprises 100 parts by weight of at least one selected from the group consisting of calcium carbonate, calcium phosphate and ferric pyrophosphate (A) and 1 to 60 parts by weight of gum arabic (B), anda calcium ion concentration M (mg/l) satisfying $10 < M \leq 500$. The composition is superior not only in re-dispersibility and dispersion stability in liquid for a long period of time, and flavor, but is capable of providing highly concentrated products, and therefor it is advantageous economically.

14 Claims, No Drawings

FOOD ADDITIVE SLURRY OR POWDER COMPOSITION AND FOOD COMPOSITION CONTAINING SAME AND METHOD OF MAKING

BACKGROUND OF THE INVENTION

1. Field of the Invention

The present invention relates to a food additive slurry composition and food additive powder composition having a high concentration and excellent dispersibility in a liquid, which is effectively utilized by adding to foods such as yogurt, cow's milk, juice and skim milk powder to enrich calcium and/or iron components, and a food composition containing the food additive slurry or powder composition.

2. Description of the Prior Art

Recently, the shortage of ingestion of calcium is often pointed out and this phenomenon is notable in growing children and aged persons. In order to solve the shortage of calcium ingestion, calcium-enriched foods have come to be sold. Even in cow's milk which is generally said to have a high content of calcium, it has been attempted to sell a calcium-enriched cow's milk by further adding calcium. Further, other calcium-enriched products such as juice and skim milk powder are started to be sold.

For example, in cow's milk and yogurt, water-soluble inorganic acid form or organic acid form calcium such as calcium lactate and calcium chloride, water-difficultly soluble inorganic form calcium such as calcium carbonate and calcium phosphate are used.

However, the water-soluble inorganic acid form or organic acid form calcium are liable to damage the stability of proteins contained in cow's milk and yogurt and thus they have a disadvantage that it is difficult to add more than a given level to thus prevent a large amount of use as materials of calcium.

On the other hand, the water-insoluble calcium in an inorganic form does not damage the stability of proteins contained in cow's milk and yogurt due to water-insolubility and thus it can be used in a large amount. The calcium in an inorganic form generally has, however, a high specific gravity of 2.7 or more and thus when said calcium is dispersed in cow's milk, it precipitates in a short time to undesirably lower the beauty in appearance. As a result, it has a disadvantage that it can not be used in a large amount.

Many methods for adding a large amount of calcium to foods have been heretofore proposed. For example, as a method for preparing a slurry of a calcium agent in an inorganic form, Japanese Patent Non-examined publication (Kokai) No. 64-69513 proposes a method for improving dispersibility of calcium carbonate by irradiating supersonic wave to a calcium carbonate slurry which was not subjected to drying and pulverization in the production step or to a mixture of the calcium carbonate slurry and a hydrophilic emulsifier with an HLB of not less than 10.

In Example 2 of this publication, a preparation method of a calcium agent slurry having approximately 8% by weight of a solid content of calcium carbonate by irradiating supersonic wave to a mixture of a 10% by weight calcium carbonate slurry and an aqueous solution of approximately 6% by weight sucrose fatty acid ester of the HLB 15.

However, with such a low concentrated calcium carbonate of 8% by weight or so obtained by this method, though a calcium agent having a good dispersibility can be obtained, it is difficult to prepare a calcium agent slurry having an average particle size of less than 0.3 $\mu$m which is excellent in dispersibility and applicable to foods being stored for a long period of time such as long-life cow's milk, and even when prepared, energy cost required for dispersion unavoidably increases. Moreover, not only an increase in energy cost, but circulation costs such as containers of the calcium agent slurry, cold storage equipment, cold storage, and transportation increase and thus it is not a preferable method.

Further, Japanese Patent Non-examined Publication (Kokai) No. 6-127909 discloses a method for preparing a calcium phosphate dispersion by wet-pulverizing a mixture of a sucrose stearic acid ester with the HLB 16 and calcium phosphate under the specific conditions, and Japanese Patent Non-examined Publication (Kokai) No. 6-127939 discloses a method for preparing a calcium carbonate dispersion by wet-pulverizing a mixture of a sucrose stearic acid ester with the HLB 16 and calcium carbonate in the similar manner.

According to these methods, though it is possible to prepare a calcium agent slurry of an average particle size of less than 0.3 $\mu$m having a good dispersibility, the solid concentration of a calcium agent slurry proposed is only approximately 10% by weight at highest, and there are also included the problems associated with equipment cost and circulation cost, as in the case of the method proposed by the above-mentioned Japanese Patent Non-examined Publication (Kokai) No. 64-69513.

Moreover, Japanese Patent Non-examined Publication (Kokai) No. 9-9919 proposes a method for improving dispersibility by adding to calcium carbonate at least one selected from the group consisting of phospholipid and protein decomposition products, followed by wet-pulverizing. However, the product obtained by this method includes the problems in flavor such as odor and bitterness. Moreover, according to this publication, since the calcium dispersion liquid obtained contains calcium carbonate of an average particle size of 1 to 3 $\mu$m, a cow's milk added with calcium obtained by this method is poor in recovery of calcium carbonate in a centrifugal separator such as a clarifier used in the production step, the precipitation tends to take place in foods such as cow's milk and thus it is not suited for foods being stored for a long period of time such as long-life cow's milk.

Furthermore, Japanese Patent Non-examined Publication (Kokai) No. 6-197736 proposes a method for preparing a dried powder by drying by the use of a drying machine such as a spray dryer a calcium agent slurry comprising a mixture of a sucrose stearic acid ester with the HLB 16 and calcium phosphate or calcium carbonate. However, the solid concentration of a calcium agent of a calcium agent slurry as the material to be dried is as low as approximately 10% by weight and thus there are also included the problems to be improved from a drying energy cost and an investment cost in a drying equipment.

In recent years, with a development of containers being stored for a long period of time for cow's milk, yogurt, juice or the like and a storage method therefor, cases where those foods are stored for a long period of time in shops, automatic vending machines, large-size domestic iceboxes or the like are increasing. In such cases, when calcium carbonate particles added for the calcium-enrichment of those foods are not good in dispersibility in the foods, they precipitate at the bottom of the container during the storage for a long period of time, which often gives unpleasant and unclean feel and impression to drinkers who take liquid foods such as cow's milk and juice.

Accordingly, in liquid foods added with inorganic particles such as calcium carbonate prepared at present for the calcium-enrichment and put on the market, since the period of dispersion stability in foods is short, the amount of the inorganic particles added have to be limited to an extremely small amount. Otherwise, the use of the inorganic particles has to be limited to such liquid foods as taken within 1 to 2 days after being purchased by consumers.

Further, in recent years, women suffering from anemia caused by the shortage of iron are increasing. This tendency is notable in high school girls and young adult women, in particular. A cause of iron-deficiency disease is caused mainly by dietary life. Generally, it is said that approximately half of women suffer from iron deficiency due to environments of iron deficiency such as physiological bleeding, increased demand of iron from pregnancy and insufficient intake from diet. In an attempt to solve the shortage of iron, iron-enriched foods come to be sold and a variety of iron-enriched products such as cows milk and soft drinks start to be sold.

For example, in the case of soft drinks, a water-soluble iron in the organic or inorganic form such as iron lactate, sodium iron citrate and ferrous gluconate and a water-insoluble or water-difficultly soluble iron in the inorganic form are used. However, the water-soluble ion in the organic or inorganic form has a drawback that since it is strong in iron taste, it is not used in a large amount at one time. On the other hand, in cases where a dispersion containing the water-insoluble or water-difficultly soluble iron such as ferric pyrophosphoric acid is used, though the iron taste is improved, it precipitates within a short time in soft drinks because of a high specific gravity of 2.75 or more. This phenomenon is undesirable from beauty in appearance as foods, as a result, it is impossible to use it in a large amount.

SUMMARY OF THE INVENTION

An object of the present invention is to provide a food additive slurry or powder composition having a high concentration which enhances circulation economy and having a high dispersibility which is suitable as an additive for foods such as cow's milk.

Another object of the present invention is to provide a calcium- or iron-enriched food composition containing the foregoing food additive slurry or powder composition.

Other objects and advantages of the present invention will become apparent to those skilled in the art from the detailed description.

DETAILED DESCRIPTION OF THE INVENTION

The present invention encompasses, in a first aspect, a food additive slurry composition which comprises 100 parts by weight of at least one selected from the group consisting of calcium carbonate and calcium phosphate (hereinafter referred to as calcium agent), and ferric pyrophosphate (hereinafter referred to as iron agent ) (A) and 1 to 60 parts by weight of gum arabic (B), and a calcium ion concentration M (mg/l) satisfying the following requirement (a):

$$10<M\leq500 \tag{a}$$

wherein M means a calcium ion concentration of a food additive slurry obtained by adjusting a solid concentration of the calcium agent of the food additive slurry after pulverized and/or dispersed to 10% by weight.

The present invention encompasses, in a second aspect, a food additive slurry composition which comprises 100 parts by weight of at least one selected from the group consisting of a calcium agent and an iron agent (A) and 1 to 60 parts by weight in total of gum arabic (B) and an additive (C), the content of the (B) component being not less than 20% by weight of the total amount of the components (B) and (C), and the (C) component comprising at least one selected from the group consisting of sucrose fatty acid ester having an HLB of not less than 8, polyglycerol fatty acid ester and polysaccharide, and a calcium ion concentration M (mg/l) satisfying the following requirement (a):

$$10<M\leq500 \tag{a}$$

wherein M means a calcium ion concentration of a food additive slurry obtained by adjusting a solid concentration of the calcium agent of the food additive slurry after pulverized and/or dispersed to 10% by weight.

The present invention encompasses, in a third aspect, a food additive powder composition which is obtained by drying and pulverizing the above-described food additive slurry composition.

The present invention encompasses, in a fourth aspect, a method for producing a food additive slurry composition which comprises carrying out at least one process selected from the group consisting of (D), (E) and (F):

(D) pulverizing and/or dispersing an aqueous suspension comprising at least one selected from the group consisting of a calcium agent and an iron agent (A) and water by a chemical dispersing process or a physical process using a pulverizer and/or a disperser, then adding gum arabic (B) or gum arabic (B) and an additive (C).

(E) pulverizing and/or dispersing an aqueous suspension comprising at least one selected from the group consisting of a calcium agent and an iron agent (A), gum arabic (B) or gum arabic (B) and an additive (C), and water by a chemical dispersing process or a physical process using a pulverizer and/or a disperser.

(F) pulverizing and/or dispersing by a chemical dispersing process or a physical process using a pulverizer and/or a disperser, an aqueous suspension containing at least one selected from the group consisting of a calcium agent and an iron magnet (A), then adding gum arabic (B) or gum arabic (B) and an additive (C), thereafter pulverizing and/or dispersing the mixture by a physical process using pulverizer and/or disperser.

The present invention encompasses, in a fifth aspect, a food composition containing the above-described food additive slurry composition and/or food additive powder composition.

The calcium carbonate as one of the calcium agents usable in the present invention may include, for example, coral calcium carbonate containing calcium carbonate of 50% by weight or more, heavy calcium carbonate and synthetic calcium carbonate. Among these, the synthetic calcium carbonate prepared by chemical synthetic processes represented by a carbon dioxide process in which milk of lime being an aqueous suspension of calcium hydroxide is reacted with carbon dioxide gas is preferable, since a fine dispersion is easy to be obtained.

As a preferable method for preparing a synthetic calcium carbonate by the carbon dioxide process, the following method is exemplified:

That is, the carbonation reaction is conducted between lime of milk and carbon dioxide gas and an aqueous suspension of the calcium carbonate obtained is prepared. In this case, calcium carbonate is prepared by stirring and/or wet-pulverizing and/or still standing an aqueous suspension of the pH Q containing calcium carbonate after completion of the carbonation reaction to thus raise the pH of the aqueous suspension to the pH R satisfying the equations (c) and (d), thereafter, adjusting the pH of the aqueous suspension to the pH S satisfying the equation (e) by removing alkali substances or lowering the concentration per volume of alkali substances:

$$R \geq 8.6 \quad (c)$$

$$10^{(R+2)}/10^Q \geq 125 \quad (d)$$

$$10^{(S+2)}/10^R \leq 80 \quad (e)$$

wherein Q and R mean a pH under the same temperature, respectively. With respect to the pH S, when S is less than 8.6, calculation is made as 8.6.

The calcium phosphate, as the other component of the calcium agents usable in the present invention stands for inorganic substances comprising calcium phosphates, and may include natural calcium phosphates containing calcium phosphate of 50% by weight or more, cow's born and synthetic calcium phosphate. Among these, synthetic calcium phosphate prepared by a chemical synthetic process in which a calcium salt such as calcium hydroxide, calcium carbonate and calcium chloride and a phosphoric acid compound such as phosphoric acid and a phosphoric acid salt such as sodium phosphate are allowed to be reacted is preferable. Among these synthetic calcium phosphates, at least one calcium phosphate selected from calcium dihydrogenpyrophosphate, calcium monohydrogenphosphate and calcium tertiary phosphate is more preferable.

As to the form of calcium carbonate and/or calcium phosphate (hereinafter referred to as "calcium agent") used as materials in the present invention, an aqueous suspension of the calcium agent prepared by a normal method or an aqueous suspension obtained by adding water to the calcium agent in the form of powder prepared by dehydrating, drying and pulverizing the foregoing aqueous suspension of the calcium agent may suffice, but the latter form is preferable from the viewpoint of the strict observance of the Food Additive Standard as well as the hygienic management.

When the calcium agent prepared by the latter process is used, as far as the pH of calcium carbonate employed is concerned, it is preferred, from the viewpoints of preventing a decrease in functions as an additive and enhancing efficiency upon pulverization and classification, to use the calcium carbonate powder having the pH of 11.7 or less at 25° C. of an aqueous suspension which is obtained by subjecting 200° C. of an aqueous suspension having the solid concentration of 20% by weight of calcium carbonate powder to supersonic wave-treatment under conditions of 300 W, 20 KHz for 10 minutes. More preferably, the calcium carbonate powder having the pH of 11.5 or less is more preferred to use.

The specific surface area of the calcium agent used as a material in the present invention measured by a nitrogen adsorption method (BET method) is preferable in the range of from 6 to 60 $m^2/g$. If it is less than 6 $m^2/g$, the stability for a long period of time in liquid foods such as cow's milk sometimes becomes problematic, while if it is more than 60 $m^2/g$, calcium carbonate particles sometimes aggregate so strongly that they are difficult to disperse.

As the ferric pyrophosphoric acid as the iron agent usable in the present invention, a synthetic ferric pyrophoshoric acid obtained by a chemical synthesis as described below may be exemplified:

That is, ferric chloride is dissolved in water and to this solution is added an aqueous solution obtained by dissolving sodium pyrophosphate in hot water and the mixture is stirred. After completion of the reaction, the solution is dehydrated by the use of a filter press. To the dehydrated cake obtained is water added again and the mixture is stirred to thus obtain an aqueous solution of ferric pyrophosphoric acid having the same concentration as that before the dehydration. This procedure is repeated twice and the aqueous solution of ferric pyrophosphoric acid is dehydrated by the use of a filter press, the cake obtained is dried by the use of a paddle dryer, then pulverized by the use of a dry-pulverizer to thereby prepare a powder of ferric pyrophosphoric acid. Meanwhile, the ferric pyrophosphoric acid slurry may be used as it is without such drying and pulverization as mentioned above.

The specific surface area of the ferric pyrophosphoric acid powder measured by a nitrogen adsorption method (BET method) is preferable in the range of 3 to 50 $m^2/g$. If it is less than 3 $m^2/g$, the stability for a long period of time in liquid foods such as cow's milk sometimes becomes problematic, while if it is more than 50 $m^2/g$, ferric pyrophosphoric acid particles sometimes aggregate so strongly that they are difficult to disperse.

Next, a food additive slurry composition is prepared which comprises (A) at least one selected from a calcium agent and an iron agent, (B) gum arabic, or (B) gum arabic and (C) an additive comprising at least one selected from the group consisting of sucrose fatty acid ester having an HLB of not less than 8, polyglycerol fatty acid ester and polysaccharide, and water.

The preparation method of the food additive slurry composition is classified into the three methods (D), (E) and (F), but any one of these methods or two or more of these methods may be used.

(D) pulverizing and/or dispersing an aqueous suspension comprising at least one selected from the group consisting of a calcium agent and an iron agent (A) and water by a chemical dispersing process or a physical process using a pulverizer and/or a disperser, then adding gum arabic (B), or gum arabic (B)and an additive (C).

(E) pulverizing and/or dispersing an aqueous suspension comprising at least one selected from the group consisting of a calcium agent and an iron agent (A), gum arabic (B), or gum arabic (B) and an additive (C), and water by a chemical dispersing process or a physical process using a pulverizer and/or a disperser.

(F) pulverizing and/or dispersing by a chemical dispersing process or a physical process using a pulverizer and/or a disperser, an aqueous suspension containing at least one selected from the group consisting of a calcium agent and an iron agent (A), then adding gum arabic (B), or gum arabic (B) and an additive (C), thereafter pulverizing and/or dispersing the mixture by a physical process using pulverizer and/or disperser.

In the above (D), (E) and (F), the chemical dispersing process means dispersing by, for example, pH control and aging.

The essential requirement for preparing the food additive slurry composition comprising (A) at least one selected from a calcium agent and an iron agent, (B) gum arabic, and water according to the methods (D), (E) and (F) as above-mentioned is that the component (B) is contained in an amount of 1 to 60 parts by weight based on 100 parts by weight of the component (A). If the feeling in throat-passage of liquid foods such as cow's milk is taken into consideration, the component (B) is preferably contained in an amount of 1.5 to 40 parts by weight, more preferably 3 to 25 parts by weight based on 100 parts by weight of the component (A).

If the amount of the component (B) is less than 1 part by weight, even when the average particle size in the particle size distribution of a calcium agent and/or an iron agent (A) contained in the food additive slurry composition is controlled minutely, if the slurry composition is added to liquid foods such as cow's milk, juice and yogurt of a drink type, the calcium agent and/or the iron agent is inferior in stability with passage of time, and in the worst case, aggregate and precipitate at the bottom of a container within 24 hours. On the other hand, if the amount of the component (B) is more than 60 parts by weight, when the food additive composition is added to liquid foods such as cow's milk, juice and yogurt of a drink type, the viscosity of the product increases not only to be undesirable in eating impression, but to make it difficult to produce a highly concentrated product with an increase in viscosity. As a result, the production has to be limited to the product with a low solid concentration, which is undesirable from the viewpoint of economy.

There are no problems at all when the food additive slurry composition comprising at least one selected from a calcium agent and an iron agent (A), gum arabic (B), and water prepared by the method as aforesaid is added to cow's milk of a general type. However, in cases where it is added to a long life cow's milk, when a super high temperature sterilization is applied, the stability with passage of time of the calcium agent and/or the iron agent becomes poor because of an insufficient heat resistance of gum arabic (B) to thereby make it difficult to keep the stability for a long period of time.

Accordingly, the preferable condition for producing a food additive slurry composition for use in a long life cow's milk prepared by a super high temperature sterilization method is that to 100 parts by weight of at least one selected from a calcium agent and an iron agent (A), gum arabic (B) and an additive (C) are not only contained in 1–60 parts by weight in total, but the amount of the component (B) is not less than 20% by weight of the total amount of the components (B) and (C), more preferably 55 to 99.99% by weight.

As the additive (C) usable conjointly with the gum arabic (B), the additive having a good compatibility with the gum arabic (B) in water is preferred to use. The additive (C) may include sucrose fatty acid ester having an HLB of not less than 8, polyglycerol fatty acid ester and polysaccharide, and these may be used singly or in combination of two or more. The polysaccharide may include, for example, gellan gum, carageenan, sodium alaginate, guar gum, gellan gum, karaya gum, carboxymethyl cellulose (CMC), alginic acid propylene glycol ester (PGA), tamarind gum, gum ghatti, tragacanth gum, xanthane gum, pullulan, cassia gum, locust bean gum, arabinogalactan and sclero gum, and these are used singly or in combination of two or more.

In order to enhance the heat resistance more effectively through the conjoint use of the additive (C), it is preferred as the additive (C) to use at least one selected from the group consisting of sucrose fatty acid ester having an HLB of not less than 8, polyglycerol fatty acid ester, CMC, PGA, tamarind gum, gum ghatti, tragacanth gum, xanthane gum, pullulan, cassia gum, locust bean gum, arabinogalactan and sclero gum, more preferably, at least one selected from the group consisting of sucrose fatty acid ester having an HLB of not less than 8, PGA, tamarind gum, gum ghatti, xanthane gum, pullulan, locust bean gum, arabinogalactan and sclero gum.

If the total amount of the components (B) and (C) is less than 1 part by weight based on 100 parts by weight of the component (A), when, for example, the food additive composition is added to liquid foods such as cow's milk, juice and yogurt of a dink type, the calcium agent and/or the iron agent is poor in stability with passage of time, and in the worst case, it aggregates and precipitates at the bottom of a container within 24 hours. On the other hand, if it is more than 60 parts by weight, when the food additive composition is added to liquid foods such as cow's milk, juice and yogurt of a drink type, the viscosity of the product increases not only to be undesirable in eating impression, but to make it difficult to produce a highly concentrated product with an increase in viscosity. As a result, the production has to be limited to the product with a low solid concentration, which is underirable from the viewpoint of economy.

Moreover, the amount of the component (B) occupied in the total amount of the components (B) and (C) is less than 20% by weight, the viscosity of the product increases notably to thus damage a flavor which is an important factor as foods and to deteriorate eating impression On the other hand, if it is more than 99.99% by weight, the sufficient effect by addition of the additive (C) is sometimes not obtained.

Moreover, the calcium ion concentration M (mg/l) of the food additive slurry composition preferably satisfies the following requirement of (a), more preferably $15 \leq M \leq 350$, still more preferably $20 \leq M \leq 200$.

$$10 < M \leq 500 \tag{a}$$

wherein M means the calcium ion concentration of a food additive slurry composition obtained by adjusting the solid concentration of the calcium agent of the food additive slurry composition after pulverized and/or dispersed to 10% by weight.

If the calcium ion concentration M (mg/l) is less than 10, the surface stability of the calcium agent is unstable and the calcium agent becomes easy to aggregate again, so that when the food additive slurry composition is added to cow's milk or the like, the stable product is difficult to be obtained. If it is more than 500, when the food additive slurry composition is used for cow's milk, the product tends to increase in viscosity due to the stability of protein being damaged, and in a worst case, it occasionally gels.

Moreover, in usage in which the storage stability for a long period of time after production such as canned juice, the food additive slurry composition not only satisfies the above-mentioned requirement (a), but the requirement L defined by (b) among the calcium ion concentration M (mg/l), the amount J (parts by weight) of gum arabic based on 100 parts by weight of the calcium agent and the weight average diameter K ($\mu$m), preferably $0.35 \leq L \leq 200$, more preferably $0.70 \leq L \leq 70$:

$$L = \frac{J \times M}{3.14 \times K^2 \times 10000} \tag{b}$$

$$0.035 \leq L \leq 350$$

If L is less than 0.035, the calcium agent containing coarse particles is easy to be obtained and, for example, when it is used for drinks such as juice, it is difficult to keep the calcium agent stable for a long period of time, and if L is more than 350, a metalic odor tends to be strong, which is not desirable in respect of flavor.

Meanwhile, the calcium ion concentration is calculated according to the following manner:

Apparatus: 10N METER IM-40S manufactured by Toa Denpa Kogyo Co., Ltd.

Preparation of a specimen: A food additive slurry is added with a solvent to adjust a solid concentration of the calcium agent to 10% by weight. To 10 volumes of the adjusted slurry, 1 (one) volume of a calcium ion adjusting agent is added to obtain a specimen for the measurement.

Solvent: Deionized water

Moreover, the weight average particle diameter K ($\mu$m) preferably satisfies the requirement ($\alpha$) as set forth below, and it more preferably satisfies the requirement ($\beta$), still more preferably ($\gamma$) in usage in which the storage stability for a fairly long period of time is required:

$$0.04 \leq K \leq 0.8 \qquad (\alpha)$$

$$0.04 \leq K \leq 0.5 \qquad (\beta)$$

$$0.04 \leq K \leq 0.3 \qquad (\gamma)$$

If the weight average diameter K in particle size distribution of a calcium agent and/or an iron agent contained in the food additive slurry composition is greater than 0.8 $\mu$m, the calcium agent and/or the iron agent is easy to precipitate so that the composition can not be used for foods being stored for a long period of time.

The adjustment of the weight average diameter of a calcium agent and/or an ion agent contained in the food additive slurry composition to 0.8 $\mu$m or less may be made by the methods (D), (E) and (F) as mentioned above. For the pulverization and/or dispersion by the physical method, wet-pulverizers such as Dyno-mill, Sand-mill and Cobol-mill, emulsifying and dispersing apparatuses such as Nanomizer, Microfluidizer and Homogenizer, supersonic wave disperser and roll mills such as a three-roll mill may be preferably used.

Meanwhile, the weight average diameter in particle size distribution of a calcium agent and/or ferric pyrophosphoric acid contained in the food additive slurry composition of the calcium agent and/or the iron agent in the present invention is measured and calculated according to the following manner:

Apparatus: SA-CP4L manufactured by Shimadzu Corp.

Preparation of a specimen: A food additive slurry composition is added dropwise into a solvent heated to 20° C. to obtain a specimen for the measurement of the particle size distribution.

Solvent: Deionized water

Preliminary dispersing: Supersonic wave dispersion by the use of SK disperser (manufactured by Seishin Kigyo Co., Ltd.) was conducted for 100 seconds.

Measuring temperature: 20° C.±1.0° C.

The gum arabic (B) usable in the present invention is not specifically limited, but since a trace of alkali metal salts contained in gum arabic sometimes gives an adverse effect to an emulsifying system, in cases where the food additive slurry composition is applied to usage requiring a more excellent dispersibility, it is preferred to use a desalted gum arabic obtained by desalting alkali metal salts through a filtration and purifying step.

The additive (c) usable in the present invention is not specifically limited, but as sucrose fatty acid ester, the sucrose fatty acid ester preferably has an HLB of not less than 8 meeting the Food Additive Standard, more preferably has an HLB of not less than 15. With respect to the composition of fatty acids contained in the sucrose fatty acid ester, the proportion of fatty acid having 18 carbon atoms occupying the fatty acids is preferably 50% by weight or more, more preferably 60% by weight or more, still more preferably 65% by weight or more. If the fatty acid having 18 carbon atoms is less than 50% by weight, the stability of the calcium agent in foods such as cow's milk not only becomes poor, but the bitterness in flavor tends to increase.

The amount of alkali metal salts of fatty acids contained in the food additive slurry composition is preferably 0.1 to 2.0% by weight based on sucrose fatty acid ester, more preferably 0.3 to 1.5% by weight, still more preferably 0.5 to 1.5% by weight. If it is less than 0.1% by weight, the solubility of sucrose fatty acid ester in cold water tends to be inhibited, and as a result, the stability of the calcium agent in foods such as cow's milk becomes poor, and if it to more than 2.0% by weight, it is not suitable for a food additive.

The polyglycerol fatty acid ester may include various kinds of fatty acid esters of triglycerol, pentaglycerol, hexaglycerol and decaglycerol, and monoglycerol fatty acid ester of a self-emulsifying type, and among these, fatty acid esters of triglycerol or pentaglycerol are perferable. These may be used singly or in combination of two or more.

In the foregoing way, a food additive slurry composition comprising at least one selected from the group consisting of a calcium agent and an iron agent (A), gum arabic (B) or gum arabic (B) and an additive (C), and water are prepared. Moreover, a food additive powder composition is, as necessary, prepared by drying and pulverizing the slurry composition. The drying machine usable for drying the slurry composition is not specifically limited, but it is desirable to conduct drying in an extremely short time from the standpoint of preventing a change of properties. As such drying machine, a dryer of a liquid drop-spray type such as a spay dryer, a slurry dryer using a ceramic medium in a heated and fluidized state are preferably used.

The food additive slurry or powder compositions of the present invention are very excellent in re-dispersibility in water so that they are easily dispersed in water without using a specific disperser or stirring machine.

Accordingly, in preparing foods, for example, a calcium and/or iron enriched cow's milk using the food additive slurry or powder composition, it is sufficient to add to cow's milk the food additive slurry or powder composition and to stir the mixture strongly to thus allow the slurry or powder composition to be dispersed in the cow's milk, but it is also possible to add to the cow's milk an aqueous dispersion obtained by preliminarily dispersing in water the food additive slurry or powder composition. In the case of a reducing milk, it is possible to add the food additive slurry or powder composition to butter or butter oil dissolved at 60° C. or so, and to stir the mixture at a high speed, thereafter to add reducing defatted milk or non-fat dry milk for homogenization.

The calcium and/or iron agents-enriched cow's milk prepared by the above-mentioned method contains the calcium and/or iron agents removable by a clarifier in much smaller amounts than that containing calcium and/or iron agents prepared by the conventional method. That is, in foods such as cow's milk, yogurt and juice added with the food additive slurry or powder composition, the calcium agent and/or the iron agent are maintained in an extremely stable state. Moreover, the food additive slurry or powder composition of the present invention contain the calcium agent and/or the iron agent in a good state and thus it is possible to reduce the stirring time at the time of adding them to foods such as cow's milk. As a result, aggregation of the calcium agent and/or the iron agent which can be seen in cases where they are added to butter and stirred for a long time does not take place.

The food additive slurry or powder composition can be used, besides the above-described usage, for liquid foods such as cream, coffee, black tea, Oolong tea, and alcoholic beverage such as wine and sake for the purpose of enrichment of calcium and/or iron agents.

Moreover, the food additive slurry or powder composition of the present invention may be used conjointly with water-soluble calcium salts such as calcium lactate and calcium chloride, and water-soluble iron salts such as sodium iron citrate and ferrous gluconate.

Hereinafter, the present invention will be explained in more detail by way of examples and comparative examples, but the present invention is in no way limited thereby.

First, production methods for calcium carbonate, calcium tertiary phosphate and ferric pyrophosphoric acid used in examples and comparative examples will be described as below: Calcium carbonate powder I:

To 10000 liters of milk of lime having a specific gravity of 1.050 heated to 10° C., a furnace gas having a carbon dioxide gas concentration of 27% by weight (hereinafter, referred to as "carbon dioxide gas") was supplied at a rate of 25 m$^3$/min to thus cause the carbonation reaction to proceed and an aqueous calcium carbonate suspension having a pH 9.0 at 25° C. was thereby obtained.

Next, the aqueous calcium carbonate suspension having the pH 9.0 was stirred at 50° C. for 12 hours and when the suspension reached a pH 11.8 at 25° C., the suspension was dehydrated by the use of a filter press to thus obtain a dehydrated cake having a calcium carbonate solid concentration of 48% by weight. Then, to the dehydrated cake obtained, water was added again and stirred to thus obtain an aqueous calcium carbonate suspension having the same concentration as that prior to dehydration. The pH of the aqueous calcium carbonate suspension was 11.5. To the aqueous calcium carbonate suspension, carbon dioxide gas was introduced again to thus lower the pH of this suspension to 7.0, thereafter subjected to dehydration by the use of a filter press, drying by the use of a paddle dryer and pulverization by the use of a dry-pulverizer to thereby obtain a calcium carbonate powder I.

The specific surface area of the calcium carbonate powder I by a nitrogen adsorption method was measured by the use of a surface area measuring apparatus NOVA 2000 manufactured by QUANTA CHROME Co., Ltd., and the result was 30 m$^2$/g. Calcium carbonate powder II:

To 10000 liters of milk of lime having a specific gravity of 1.050 heated to 10° C., carbon dioxide gas having a carbon dioxide gas concentration of 27% by weight was supplied at a rate of 24 m$^3$/min to thus cause the carbonation reaction to proceed and an aqueous calcium carbonate suspension having a pH 9.0 at 25° C. was thereby obtained.

Next, the aqueous calcium carbonate suspension having the pH 9.0 was stirred and when the suspension reached a pH 11.8, carbon dioxide gas was introduced again to thus lower the pH of this suspension to 9.5, then the mixture was stirred at 50° C. for 60 hours. Thereafter, carbon dioxide gas was further introduced to lower the pH of the suspension to 7.0 to thereby obtain a calcium carbonate slurry. The calcium carbonate slurry obtained was subjected to dehydration by the use of a filter press, drying by the use of a paddle dryer and pulverization by the use of a dry-pulverizer to thereby obtain a calcium carbonate powder II.

The specific surface area of the calcium carbonate powder II by a nitrogen adsorption method was measured by the use of a surface area measuring apparatus NOVA 2000 manufactured by QUANTA CHROME Co., Ltd., and the result was 19 m$^2$/g.
Calcium Tertiary Phosphate Powder:

After ammonium phosphate was added to an aqueous ammoniacal calcium chloride solution, the mixture was stirred and dehydrated. The cake obtained was washed with water several times, dried and dry-pulverized to thus obtain a whitish powder. The whitish powder was confirmed to be calcium tertiary phosphate by an X-ray diffraction.

After having confirmed in the above way, an aqueous suspension of the calcium tertiary phosphate was dehydrated by the use of a filter press and the press cake obtained was dried by the use of a paddle dryer and pulverized by the use of a dry-pulverizer to thereby obtain a calcium tertiary phosphate powder.

The specific surface area of the calcium tertiary phosphate powder by a nitrogen adsorption method was measured by the use of a surface area measuring apparatus NOVA 2000 manufactured by QUANTA CHROME Co., Ltd., and the result was 40 m$^2$/g.
Ferric Pyrophosphoric Acid Powder:

307 Kg of ferric chloride were dissolved in 1 m$^3$ of water and to this mixture, a solution obtained by dissolving 233 Kg of sodium pyrophosphate in a hot water of 2.5 m$^3$ was mixed, then stirred for about 1 hour. After reaction, the solution was dehydrated by the use of a filter press. To the dehydrated case, water was added again and stirred to thus obtain an aqueous ferric pyrophosphoric acid suspension. This procedure was repeated twice and the ferric pyrophosphoric acid suspension was dehydrated by the use of a filter press, dried by the use of a paddle dryer and pulverized by the use of a dry-pulverizer to thereby obtain a ferric pyrophosphoric acid powder.

The specific surface area of the ferric pyrophosphoric acid powder by a nitrogen adsorption method was measured by the use of a surface area measuring apparatus NOVA 2000 manufactured by QUANTA CHROME Co., Ltd., and the result was 15 m$^2$/g.

EXAMPLE 1

A highly concentrated food additive slurry composition using the above-described calcium carbonate powder I was produced by adding, based on 100 parts by weight of a solid content of calcium carbonate, 20 parts by weight of gum arabic (manufactured Gokyo Sangyo Co., Ltd.) and water, mixing the mixture with stirring to obtain a food additive slurry having a calcium carbonate solid concentration of 40% by weight, and wet-pulverizing the slurry by the use of a wet-pulverizer Dyno-mill KD Pilot type (manufactured by WAB Co., Ltd.) The weight average particle diameter in particle size distribution of calcium carbonate of the food additive slurry composition was 0.19 µm. Moreover, the calcium ion concentration of the food additive slurry obtained by adjusting a solid concentration of the slurry after wet-pulvirization to 10% by weight was measured and the result was 151 mg/l. The gum arabic was added as dissolved in water preliminarily.

The highly concentrated food additive slurry composition obtained was sufficiently low in viscosity and satisfactory in fluidity. The results are shown in Tables 1 and 2. As will be later by Comparative Example 5, in cases where a food additive slurry composition is comprised of calcium carbonate and sucrose fatty acid ester of an HLB 16, it was very difficult to produce a highly concentrated food additive slurry composition.

EXAMPLES 2 AND 3

Highly concentrated food additive slurry compositions were produced in the same manner as in Example 1, except that the conditions were changed as shown in Tables 1 and 2. The highly concentrated food additive composition obtained by Example 2 was sufficiently low in viscosity and satisfactory in fluidity. On the other hand, in the highly concentrated food additive composition obtained by Example 3, the solid concentration was attempted to be enhanced to 40% by weight as in Example 1, but its solid concentration was 30% by weight because with 40% by weight, handling was difficult so that the composition had to be diluted to a degree of not interfering with handling.

The weight average particle diameter in particle size distribution of the calcium agent contained in the food additive slurry composition and the calcium ion concentration after wet-pulverization or the like were measured in the same manner as in Example 1. The results are shown in Tables 1 and 2.

EXAMPLE 4

A highly concentrated food additive slurry composition using the above-described calcium tertiary phosphate powder was produced by adding, based on 100 parts by weight of a solid content of calcium tertiary phosphate, 18 parts by weight of gum arabic, 0.3 part by weight of tamarind gum (manufactured Gokyo Sangyo Co., Ltd.) and water, mixing the mixture with stirring to obtain a food additive slurry having a solid concentration of 40% by weight, and wet-pulverizing the slurry by the use of a wet-pulverizer Dyno-mill KD pilot type. The highly concentrated food additive slurry composition was sufficiently low in viscosity and satisfactory in fluidity.

The gum arabic and tamarind gum were added as dissolved in water prelimirarily. As the gum arabic, a desalted gum arabic was used.

The weight average particle diameter in particle size distribution of the calcium agent contained in the food additive slurry composition and the calcium ion concentration after wet-pulverization or the like were measured in the same manner as in Example 1. The results are shown in Tables 1 and 2.

EXAMPLES 5 TO 10

Highly concentrated food additive slurry compositions were produced in the same manner as in Example 4, except that the conditions were changed as shown in Tables 1 and 2. The highly concentrated food additive compositions obtained by Examples 5 and 6 were sufficiently low in viscosity and satisfactory in fluidity. On the other hand, in the highly concentrated food additive composition obtained by Examples 7 to 10, the solid concentrations were attempted to be enhanced to 40% by weight as in Example 4, but their solid concentrations were those as shown in Table 1 because with 40% by weight, handling was difficult so that the compositions had to be diluted to a degree of not interfering with handling.

The weight average particle diameters in particle size distributions of the calcium agents contained in the food additive slurry compositions and the calcium ion concentrations after wet-pulverization or the like were measured in the same manner as in Example 1. The results are shown in Tables 1 and 2. Meanwhile, the gum arabic and additives used in those examples were used as dissolved in water preliminarily. Moreover, as regards substances such as sucrose fatty acid ester which were difficult to be dissolved in water, those were, as necessary, dissolved in hot water heated to 75° C. and cooled to 20° C., then used.

EXAMPLE 11

A highly concentrated food additive composition using a mixture of the above-described calcium carbonate powder II and ferric pyrophosphoric acid powder with a proportion of 30:1 was produced by adding, based on 100 parts by weight of the total solid content of calcium carbonate and ferric pyrophosphoric acid, 53 parts by weight of gum arabic, 0.2 part by weight of pentaglycerol fatty acid ester, 0.1 part by weight of arabinogalactan and water, mixing the mixture with stirring to obtain a food additive slurry composition having 31% by weight in solid concentration of both calcium carbonate and ferric pyrophosphoric acid, followed by wet-pulverization by the use of a wet-pulverizer Dyno-mill KD pilot type.

Meanwhile, the solid concentration of the highly concentrated food additive slurry composition obtained by this example was attempted to be enhanced to 40% by weight as in Example 4, but its solid concentration was as shown in Table 1 because with 40% by weight, handling was difficult so that the composition had to be diluted to a degree of not interfering with handling.

The gum arabic and an additive used in this example were added as dissolved in water prelimirarily. As the gum arabic, a desalted gum arabic was used.

The weight average particle diameter in particle size distribution of the calcium agent and the iron agent contained in the food additive slurry composition and the calcium ion concentration after wet-pulverization or the like were measured in the same manner as in Example 1. The results are shown in Tables 1 and 2.

EXAMPLE 12

A highly concentrated food additive slurry composition using the above-described ferric pyrophosphoric acid powder was produced by adding, based on 100 parts by weight of a solid content of the ferric pyrophosphoric acid, 23 parts by weight of gum arabic and water, mixing the mixture with stirring to obtain a food additive slurry having a solid concentration in ferric pyrophosphoric acid of 30% by weight, and wet-pulverizing the slurry by the use of a wet-pulverizer Dyno-mill KD pilot type.

Meanwhile, the gum arabic was used as dissolved in water preliminarily. As the gum arabic, a desalted gum arabic was used.

The weight average particle diameter in particle size distribution of the ferric pyrophosphoric acid contained in the food additive slurry composition was 0.30 μm. The food additive slurry composition obtained was sufficiently low in viscosity and satisfactory in fluidity.

EXAMPLES 13 AND 14

Highly concentrated food additive slurry compositions were produced in the same manner as in Example 12, except that the conditions were changed as shown in Table 1. The solid concentration of the highly concentrated food additive composition obtained by this example was attempted to be enhanced to 30% by weight as in Example 12, but its solid concentration was as shown in Table 1 because with 30% by weight, handling was difficult so that the composition had to be diluted to a degree of not interfering with handling.

Meanwhile, the gum arabic was used as dissolved in water preliminarily. As the gum arabic, a desalted gum arabic was used.

The weight average particle diameter in particle size distribution of the iron agent contained in the food additive slurry composition is shown in Table 1.

COMPARATIVE EXAMPLES 1 AND 2

Food additive slurry compositions were produced in the same manner as in Example 1, except that the conditions were changed as shown in Tables 2 and 3. The solid concentrations in calcium agent of the food additive compositions obtained by those comparative examples were attempted to be enhanced to 40% by weight as in Example 1, but their solid concentrations were as shown in Table 3 because with 40% by weight, handling was difficult so that the compositions had to be diluted to a degree of not interfering with handling.

The weight average particle diameters in particle size distributions of the calcium agent contained in the food additive slurry compositions and the calcium ion concentrations after wet-pulverization were measured in the same manner as in Example 1 and the results are shown in Tables 2 and 3.

COMPARATIVE EXAMPLES 3 AND 4

Food additive slurry compositions were produced in the same manner as in Example 4, except that the conditions were changed as shown in Tables 2 and 3. The solid concentrations in calcium agent of the food additive compositions obtained by those comparative examples were attempted to be enhanced to 40% by weight as in Example 4, but their solid concentrations were as shown in Table 3 because with 40% by weight, handling was difficult so that the compositions had to be diluted to a degree of not interfering with handling.

The weight average particle diameters in particle size distributions of the calcium agent contained in the food additive slurry compositions and the calcium ion concentrations after wet-pulverization were measured in the same manner as in Example 1 and the results are shown in Tables 2 and 3.

COMPARATIVE EXAMPLE 5

A highly concentrated food additive slurry composition using the above-described calcium carbonate II was produced by adding, based on 100 parts by weight of a solid content of calcium carbonate, 20 parts by weight of sucrose fatty acid ester of an HLB 16 and water, mixing the mixture with stirring and wet-pulverizing the slurry by the use of a wet-pulverizer Dyno-mill KD pilot type to obtain a food additive slurry having a solid concentration in calcium carbonate of 15% by weight. The solid concentration in calcium agent of the food additive composition obtained was attempted to be enhanced to 40% by weight as in Example 1, but its solid concentration was as described above because with 40% by weight, handling was difficult due to non-fluidity so that the composition had to be diluted to a degree of not interfering with handling. Meanwhile, the sucrose fatty acid ester was added as preliminarily dissolved in hot water of 65° C. and cooled to 20° C. Moreover, the amount of alkali metals contained in alkali metal salts of fatty acids to the sucrose fatty acid ester was 0.7. The weight average particle diameter in particle size distribution of the calcium agent contained in the food additive slurry composition was 0.15 μm.

COMPARATIVE EXAMPLES 6 AND 7

Food additive slurry compositions were produced in the same manner as in Example 10, except that the conditions were changed as shown in Table 3. The solid concentrations in iron agent of the food additive compositions obtained by those comparative examples were attempted to be enhanced to 30% by weight as in Example 10, but their solid concentrations were as shown in Table 3 because with 30% by weight, handling was difficult so that the compositions had to be diluted to a degree of not interfering with handling. Meanwhile, the gum arabic was used as dissolved in water preliminarily. As the gum arabic, a desalted gum arabic was used.

The weight average particle diameters in particle size distributions of the iron agent contained in the food additive slurry compositions are shown in Table 3.

EXAMPLES 15 TO 28, COMPARATIVE EXAMPLES 8 TO 14

The food additive slurry compositions obtained by Examples 1 to 14 and Comparative Examples 1 to 7 were dried by the use of a spray dryer to thus obtain food additive powder compositions.

Next, the food additive powder compositions were added into water stirred at 11000 rpm for 15 minuted by the use of a Homomixer so that re-dispersed suspensions having the same slurry concentrations in calcium agent and/or iron agent as those prior to being powdered were prepared. The viscosities of the re-dispersed suspensions of the food additive powder compositions were nearly the same as those of the food additive slurry compositions before drying and fluidities were quite satisfactory.

The weight average particle diameters in particle size distributions of the calcium agent and/or the iron agent contained in the re-dispersed suspensions are shown in Tables 1 and 3.

TABLE 1

|  | Gum arabic (B) | | | Additive (C) | | Kind of | | | | |
|---|---|---|---|---|---|---|---|---|---|---|
|  | Kind | (1) Parts | (2) % | Kind | (3) Parts | Ca/Fe agent | X | K |  | Z |
| Example 1 | ① | 20 | 100 | — | — | CC I | 40 | 0.19 | Example 15 | 0.19 |
| Example 2 | ② | 9 | 100 | — | — | CP | 40 | 0.22 | Example 16 | 0.21 |
| Example 3 | ② | 2.5 | 100 | — | — | CC II | 30 | 0.70 | Example 17 | 0.69 |
| Example 4 | ② | 18 | 98.36 | Tamarind | 0.3 | CP | 40 | 0.20 | Example 18 | 0.19 |
| Example 5 | ① | 13 | 68.42 | Gum ghatti | 6 | CC II | 40 | 0.18 | Example 19 | 0.17 |
| Example 6 | ① | 22 | 99.10 | Sclero gum | 0.2 | CC II | 40 | 0.16 | Example 20 | 0.17 |
| Example 7 | ① | 5 | 25.00 | Pullulan | 15 | CC I | 30 | 0.21 | Example 21 | 0.20 |
| Example 8 | ① | 3 | 15.00 | Traganth gum | 17 | CC I | 18 | 0.18 | Example 22 | 0.18 |
| Example 9 | ① | 30 | 81.08 | SE | 6 | CC II | 33 | 0.17 | Example 23 | 0.17 |
|  |  |  |  | Locust bean gum | 1 |  |  |  |  |  |
| Example 10 | ① | 1.2 | 70.59 | Xanthane gum | 0.5 | CC II | 30 | 0.23 | Example 24 | 0.23 |
| Example 11 | ② | 53 | 99.44 | Glycerol | 0.2 | CC II | 30 | 0.15 | Example 25 | 0.16 |
|  |  |  |  | Arabinogalactan | 0.1 | IRON | 1 |  |  |  |

TABLE 1-continued

|  | Gum arabic (B) | | | Additive (C) | | Kind of | | | | |
|---|---|---|---|---|---|---|---|---|---|---|
|  | Kind | (1) Parts | (2) % | Kind | (3) Parts | Ca/Fe agent | X | K |  | Z |
| Example 12 | ② | 23 | 100 | — | — | IRON | 30 | 0.30 | Example 26 | 0.30 |
| Example 13 | ② | 50 | 90.91 | Pullulan | 5 | IRON | 25 | 0.28 | Example 27 | 0.29 |
| Example 14 | ② | 2 | 66.67 | PGA | 1 | IRON | 25 | 0.33 | Example 28 | 0.32 |

Notes:
(1) Parts by weight based on 100 parts by weight of Ca agent and/or Fe agent
(2) % by weight of (B) occupying the total amount of (B) and (C)
(3) Parts by weight based on 100 parts by weight of Ca agent and/or Fe agent In Table 1, abbreviations mean the following substances:

Glycerol: Pentaglycerol fatty acid ester
SE: Sucrose fatty acid ester
PGA: Propylene glycol alginate
Locust bean: locust bean gum
① Gum arabic of a general type
② Gum arabic of a desalted type
CC I: Calcium carbonate powder I
CC II: Calcium carbonate powder II
CP: Calcium tertiary phosphate powder
Iron: Ferric phosphoric acid powder
X: Solid concentration of a calcium agent and/or an iron agent (% by weight)
K: Weight average particle diameter in particle size distribution of a calcium agent and/or an iron agent contained in a food additive slurry composition ($\mu$m)
Z: Weight average particle diameter in particle size distribution of a calcium agent and/or an iron agent contained in a re-dispersed suspension of a calcium agent and/or an iron agent powder composition ($\mu$m)

TABLE 2

|  | M | J | K | L |
|---|---|---|---|---|
| Exampl 1 | 151 | 20 | 0.19 | 26.64 |
| Exampl 2 | 63 | 9 | 0.22 | 3.73 |
| Exampl 3 | 22 | 2.5 | 0.70 | 0.037 |
| Exampl 4 | 131 | 18 | 0.20 | 18.77 |
| Exampl 5 | 105 | 13 | 0.18 | 13.42 |
| Exampl 6 | 165 | 22 | 0.16 | 45.16 |
| Exampl 7 | 55 | 5 | 0.21 | 1.99 |
| Exampl 8 | 31 | 3 | 0.18 | 0.914 |
| Exampl 9 | 235 | 30 | 0.17 | 77.69 |
| Exampl 10 | 15 | 1.2 | 0.23 | 0.108 |
| Exampl 11 | 380 | 53 | 0.15 | 285.1 |
| Comp. Ex. 1 | 10 | 0.8 | 0.29 | 0.030 |
| Comp. Ex. 2 | 496 | 65 | 0.15 | 456.3 |
| Comp. Ex. 3 | 8 | 0.3 | 0.25 | 0.012 |
| Comp. Ex. 4 | 616 | 80 | 0.15 | 697.5 |

M: Calcium ion concentration of a food additive slurry obtained by adjusting a solid concentration of the calcium agent of the food additive slurry after pulverized and/or dispersed to 10% by weight (mg/l)
J: Amount of gum arabic added based on 100 parts by weight of a calcium agent (parts by weight)
K: Weight average particle diameter in particle size distribution of a calcium agent contained in a food additive slurry composition ($\mu$m)

$$L = \frac{J \times M}{3.14 \times K^2 \times 10000}$$

$0.035 \leq L \leq 350$

TABLE 3

|  | Gum arabic (B) | | | Additive (C) | | Kind of | | | | |
|---|---|---|---|---|---|---|---|---|---|---|
|  | Kind | (1) Parts | (2) % | Kind | (3) Parts | Ca/Fe agent | X | K |  | Z |
| Comp. Ex. 1 | ① | 0.8 | 100 | — | — | CC I | 15 | 0.29 | Comp. Ex. 8 | 0.28 |
| Comp. Ex. 2 | ① | 65 | 100 | — | — | CC II | 22 | 0.15 | Comp. Ex. 9 | 0.15 |
| Comp. Ex. 3 | ② | 0.3 | 75.00 | Tamarind | 0.1 | CP | 15 | 0.25 | Comp. Ex. 10 | 0.27 |
| Comp. Ex. 4 | ② | 80 | 88.89 | Gum ghatti | 10 | CP | 18 | 0.17 | Comp. Ex. 11 | 0.16 |
| Comp. Ex. 5 | — | — | 0 | SE | 20 | CC II | 15 | 0.15 | Comp. Ex. 12 | 0.15 |
| Comp. Ex. 6 | ② | 0.6 | 100 | — | — | IRON | 10 | 0.32 | Comp. Ex. 13 | 0.33 |
| Comp. Ex. 7 | ② | 70 | 95.89 | PGA | 3 | IRON | 12 | 0.31 | Comp. Ex. 14 | 0.31 |

What are meant by notes (1) to (3) and abbreviations are the same as in Table 1.

Next, the food additive slurry compositions and the re-dispersed suspensions of the powder compositions prepared by Examples 1 to 28 and Comparative Examples 1 to 14 were diluted to 0.75% by weight in solid concentration of the calcium agent and 0.08% by weight in solid concentration of the iron agent, respectively. Each of the diluted suspensions was taken into a 100 ml measuring cylinder and left to stand at 10° C. to thus separate a transparent portion caused by precipitates of calcium carbonate, calcium phosphate and ferric pyrophosphoric acid and a colored portion dispersed by the calcium agent and/or iron agent. Changes with time in the interfacial height and the amount of the precipitate were visually inspected and stability of each suspension in water was observed. Scale by ml was read and the results are shown by the following 5-rank evaluation in Table 4.

(Interfacial height)
Interfacial height is not less than 98 ml and not more than 100 ml:5
Interfacial height is not less than 95 ml and less than 98 ml :4
Interfacial height is not less than 90 ml and less than 95 ml :3
Interfacial height is not less than 50 ml and 90 ml :2
Interfacial height is less than 50 ml :1

(Amount of precipitate)
Precipitate is rarely observed :5
Precipitate is slightly observed :4
Precipitate in about 0.5 mm is observed :3
Precipitate in not less than 0.5 mm and less than 2 mm is observed:2
Precipitate in not less than 2 mm is observed :1

TABLE 4

|  | Interfacial height After | | | Amount of precipitate After | | |
| --- | --- | --- | --- | --- | --- | --- |
|  | 1 day | 3 days | 7 days | 1 day | 3 days | 7 days |
| Example 1 | 5 | 5 | 4 | 5 | 5 | 4 |
| Example 2 | 5 | 5 | 5 | 5 | 5 | 5 |
| Example 3 | 4 | 3 | 2 | 4 | 2 | 2 |
| Example 4 | 5 | 5 | 5 | 5 | 5 | 5 |
| Example 5 | 5 | 5 | 5 | 5 | 5 | 5 |
| Example 6 | 5 | 5 | 5 | 5 | 5 | 5 |
| Example 7 | 5 | 5 | 5 | 5 | 5 | 5 |
| Example 8 | 5 | 5 | 5 | 5 | 5 | 5 |
| Example 9 | 5 | 5 | 5 | 5 | 5 | 5 |
| Example 10 | 4 | 3 | 3 | 4 | 3 | 3 |
| Example 11 | 5 | 5 | 5 | 5 | 5 | 5 |
| Example 12 | 5 | 5 | 5 | 5 | 5 | 5 |
| Example 13 | 5 | 5 | 5 | 5 | 5 | 5 |
| Example 14 | 4 | 3 | 3 | 4 | 3 | 3 |
| Example 15 | 5 | 5 | 4 | 5 | 4 | 4 |
| Example 16 | 5 | 5 | 5 | 5 | 5 | 5 |
| Example 17 | 4 | 3 | 2 | 4 | 2 | 2 |
| Example 18 | 5 | 5 | 5 | 5 | 5 | 5 |
| Example 19 | 5 | 5 | 5 | 5 | 5 | 5 |
| Example 20 | 5 | 5 | 5 | 5 | 5 | 5 |
| Example 21 | 5 | 5 | 5 | 5 | 5 | 5 |
| Example 22 | 5 | 5 | 5 | 5 | 5 | 5 |
| Example 23 | 5 | 5 | 5 | 5 | 5 | 5 |
| Example 24 | 4 | 3 | 3 | 4 | 3 | 3 |
| Example 25 | 5 | 5 | 5 | 5 | 5 | 5 |
| Example 26 | 5 | 5 | 5 | 5 | 5 | 5 |
| Example 27 | 5 | 5 | 5 | 5 | 5 | 5 |
| Example 28 | 4 | 3 | 3 | 4 | 3 | 3 |
| Comp. Ex. 1 | 2 | 1 | 1 | 1 | 1 | 1 |
| Comp. Ex. 2 | 5 | 5 | 5 | 5 | 5 | 4 |
| Comp. Ex. 3 | 1 | 1 | 1 | 1 | 1 | 1 |
| Comp. Ex. 4 | 5 | 5 | 5 | 5 | 5 | 5 |
| Comp. Ex. 5 | 5 | 5 | 5 | 5 | 5 | 5 |
| Comp. Ex. 6 | 1 | 1 | 1 | 1 | 1 | 1 |
| Comp. Ex. 7 | 5 | 5 | 5 | 5 | 5 | 5 |
| Comp. Ex. 8 | 1 | 1 | 1 | 1 | 1 | 1 |
| Comp. Ex. 9 | 5 | 5 | 4 | 5 | 5 | 4 |
| Comp. Ex. 10 | 1 | 1 | 1 | 1 | 1 | 1 |
| Comp. Ex. 11 | 5 | 5 | 5 | 5 | 5 | 5 |
| Comp. Ex. 12 | 5 | 5 | 5 | 5 | 5 | 5 |
| Comp. Ex. 13 | 1 | 1 | 1 | 1 | 1 | 1 |
| Comp. Ex. 14 | 5 | 5 | 5 | 5 | 5 | 5 |

EXAMPLE 29

200 g of the food additive slurry composition prepared by Example 1 were dispersed in 500 g of butter dissolved at 60° C. This dispersion was added with stirring into 9.30 Kg of defatted milk and the mixture was sterilized to thus obtain a calcium-enriched milk. The calcium-enriched milk was taken into several measuring cylinders of 100 ml and they were stored at 5° C. The milk was taken out quetly periodically and a change with time in the amount of the precipitate at the bottom of the measuring cylinder was visually inspected. The results were shown by the following 4-rank evaluation in Table 5.

(Amount of precipitate)
Precipitate is rarely observed :4
Precipitate is slightly observed :3
Precipitate in a small amount is observed :2
Precipitate in a large amount is observed :1

(Flavor)
Flavor is good :5
Flavor is slightly concerned about (Incongruity is somewhat felt.):4
Flavor is slightly bad (Unpleasantness is somewhat felt.) :3
Flavor is considerably bad (Unpleasantness is considerably felt.) :2
Flavor is vely bad (Unpleasantness is strongly felt.) :1

EXAMPLES 30 TO 39, EXAMPLES 43 TO 53, COMPARATIVE EXAMPLES 15 TO 19, COMPARATIVE EXAMPLES 22 TO 26

Calcium- or iron-enriched cow's milks were obtained in the same manner as in Example 29, except that the food additive slurry compositions or the re-dispersed suspensions of the food additive slurry or powder compositions prepared by Examples 2 to 11, Examples 15 to 25, Comparative Examples 1 to 5, Comparative Examples 8 to 12 were used and that each calcium agent concentration was adjusted to the same concentration as in Example 29. The inspection of the precipitate and seosory test for flavor were performed in the same manner as in Example 29. The results are shown in Table 5.

EXAMPLE 40

25 g of the food additive slurry composition prepared by Example 12 were dispersed in 500 g of butter dissolved at 60° C. This dispersion was added with stirring into 9.45 Kg of defatted milk and the mixture was sterilized to thus obtain an iron-enriched milk. The inspection of the precipitate and seosory test for flavor were performed in the same manner as in Example 29. The results are shown in Table 5.

EXAMPLES 41, 42, 54 TO 56, COMPARATIVE EXAMPLES 20, 21, 27, 28

Iron-enriched cow's milks were obtained in the same manner as in Example 40, except that the food additive slurry compositions or the re-dispersed suspensions of the food additive powder compositions prepared by Examples 13, 14, 26 to 28, Comparative Examples 6, 7, 13 and 14 were used and that each iron agent concentration was adjusted to the same concentration as in Example 40. The inspection of the precipitate and seosory test for flavor were performed in the same manner as in Example 29. The results are shown in Table 5.

TABLE 5

| Slurry comp. or re-dispersed suspension of powder comp. | | Amount of precipitate After | | | |
|---|---|---|---|---|---|
| | | 3 days | 7 days | 14 days | Flavor |
| Example 29 | Product of Example 1 | 4 | 4 | 3 | 5 |
| Example 30 | Product of Example 2 | 4 | 4 | 3 | 5 |
| Example 31 | Product of Example 3 | 3 | 2 | 2 | 4 |
| Example 32 | Product of Example 4 | 4 | 4 | 4 | 5 |
| Example 33 | Product of Example 5 | 4 | 4 | 4 | 5 |
| Example 34 | Product of Example 6 | 4 | 4 | 4 | 5 |
| Example 35 | Product of Example 7 | 4 | 4 | 4 | 3 |
| Example 36 | Product of Example 8 | 4 | 4 | 4 | 2 |
| Example 37 | Product of Example 9 | 4 | 4 | 4 | 4 |
| Example 38 | Product of Example 10 | 3 | 3 | 2 | 4 |
| Example 39 | Product of Example 11 | 4 | 4 | 4 | 3 |
| Example 40 | Product of Example 12 | 4 | 4 | 4 | 5 |
| Example 41 | Product of Example 13 | 4 | 4 | 4 | 3 |
| Example 42 | Product of Example 14 | 3 | 3 | 2 | 4 |
| Example 43 | Product of Example 15 | 4 | 3 | 3 | 4 |
| Example 44 | Product of Example 16 | 4 | 4 | 4 | 4 |
| Example 45 | Product of Example 17 | 3 | 2 | 2 | 3 |
| Example 46 | Product of Example 18 | 4 | 4 | 4 | 5 |
| Example 47 | Product of Example 19 | 4 | 4 | 4 | 5 |
| Example 48 | Product of Example 20 | 4 | 4 | 4 | 5 |
| Example 49 | Product of Example 21 | 4 | 4 | 4 | 3 |
| Example 50 | Product of Example 22 | 4 | 4 | 4 | 2 |
| Example 51 | Product of Example 23 | 4 | 4 | 4 | 4 |
| Example 52 | Product of Example 24 | 3 | 2 | 2 | 4 |
| Example 53 | Product of Example 25 | 4 | 4 | 4 | 3 |
| Example 54 | Product of Example 26 | 4 | 4 | 3 | 4 |
| Example 55 | Product of Example 27 | 4 | 4 | 4 | 3 |
| Example 56 | Product of Example 28 | 3 | 3 | 2 | 4 |
| Comp. Ex. 15 | Product of Comp. Ex. 1 | 2 | 1 | 1 | 3 |
| Comp. Ex. 16 | Product of Comp. Ex. 2 | 4 | 4 | 3 | 1 |
| Comp. Ex. 17 | Product of Comp. Ex. 3 | 1 | 1 | 1 | 3 |
| Comp. Ex. 18 | Product of Comp. Ex. 4 | 4 | 4 | 4 | 1 |
| Comp. Ex. 19 | Product of Comp. Ex. 5 | 4 | 4 | 4 | 5 |
| Comp. Ex. 20 | Product of Comp. Ex. 6 | 2 | 1 | 1 | 2 |
| Comp. Ex. 21 | Product of Comp. Ex. 7 | 4 | 4 | 4 | 1 |
| Comp. Ex. 22 | Product of Comp. Ex. 8 | 2 | 1 | 1 | 2 |
| Comp. Ex. 23 | Product of Comp. Ex. 9 | 4 | 4 | 3 | 1 |
| Comp. Ex. 24 | Product of Comp. Ex. 10 | 1 | 1 | 1 | 2 |
| Comp. Ex. 25 | Product of Comp. Ex. 11 | 4 | 4 | 4 | 1 |
| Comp. Ex. 26 | Product of Comp. Ex. 12 | 4 | 4 | 4 | 5 |
| Comp. Ex. 27 | Product of Comp. Ex. 13 | 2 | 1 | 1 | 1 |
| Comp. Ex. 28 | Product of Comp. Ex. 14 | 4 | 4 | 4 | 1 |

EXAMPLE 57

200 g of the food additive slurry composition prepared by Example 1 were dispersed in 300 g of butter dissolved at 60° C. This dispersion was added with stirring into 9.50 Kg of defatted milk and the mixture was sterilized at an ultra high temperature to thus obtain a long-life calcium-enriched milk. The inspection of the precipitate and seosory test for flavor were performed in the same manner as in Example 29. The results are shown in Table 5.

EXAMPLES 58 to 67, EXAMPLES 71 to 81, COMPARATIVE EXAMPLES 29 TO 33, COMPARATIVE EXAMPLES 36 to 40

Long-life calcium- or iron-enriched cow's milks were obtained in the same manner as in Example 57, except that the food additive slurry compositions or the re-dispersed suspensions of the food additive powder compositions prepared by Examples 2 to 11, Examples 15 to 25, Comparative Examples 1 to 5, Comparative Examples 8 to 12 were used and that each calcium agent concentration was adjusted to the same concentration as in Example 57. The inspection of the precipitate and seosory test for flavor were performed in the same manner as in Example 29. The results are shown in Table 6.

EXAMPLE 68

25 g of the food additive slurry composition prepared by Example 12 were dispersed in 300 g of butter dissolved at 60° C. This dispersion was added with stirring into 9.65 Kg of defatted milk and the mixture was sterilized at an ultra high temperature to thus obtain a long-life iron-enriched milk. The inspection of the precipitate and seosory test for flavor were performed in the same manner as in Example 29. The results are shown in Table 6.

EXAMPLES 69, 70, 82 TO 84, COMPARATIVE EXAMPLES 34, 35, 41, 42

Long-life iron-enriched cow's milks were obtained in the same manner as in Example 68, except that the food additive slurry compositions or the re-dispersed suspensions of the food additive powder compositions prepared by Examples 13, 14, 26 to 28, Comparative Examples 6, 7, 13 and 14 were used and that each iron agent concentration was adjusted to the same concentration as in Example 68. The inspection of the precipitate and seosory test for flavor were performed in the same manner as in Example 29. The results are shown in Table 6.

TABLE 6

| Slurry comp. or re-dispersed suspension of powder comp. | | Amount of precipitate After | | | |
|---|---|---|---|---|---|
| | | 10 days | 20 days | 60 days | Flavor |
| Example 57 | Product of Example 1 | 3 | 2 | 2 | 3 |
| Example 58 | Product of Example 2 | 3 | 2 | 2 | 3 |
| Example 59 | Product of Example 3 | 2 | 2 | 1 | 2 |
| Example 60 | Product of Example 4 | 4 | 4 | 4 | 5 |
| Example 61 | Product of Example 5 | 4 | 4 | 4 | 5 |
| Example 62 | Product of Example 6 | 4 | 4 | 4 | 5 |
| Example 63 | Product of Example 7 | 4 | 4 | 4 | 4 |
| Example 64 | Product of Example 8 | 4 | 4 | 4 | 2 |
| Example 65 | Product of Example 9 | 4 | 4 | 4 | 4 |
| Example 66 | Product of Example 10 | 3 | 2 | 2 | 4 |
| Example 67 | Product of Example 11 | 4 | 4 | 3 | 3 |
| Example 68 | Product of Example 12 | 3 | 2 | 2 | 3 |
| Example 69 | Product of Example 13 | 4 | 4 | 4 | 3 |
| Example 70 | Product of Example 14 | 3 | 2 | 2 | 3 |
| Example 71 | Product of Example 15 | 3 | 2 | 2 | 3 |
| Example 72 | Product of Example 16 | 3 | 2 | 1 | 2 |
| Example 73 | Product of Example 17 | 2 | 1 | 1 | 2 |
| Example 74 | Product of Example 18 | 4 | 4 | 3 | 5 |
| Example 75 | Product of Example 19 | 4 | 4 | 4 | 5 |
| Example 76 | Product of Example 20 | 4 | 4 | 3 | 5 |
| Example 77 | Product of Example 21 | 4 | 4 | 4 | 3 |
| Example 78 | Product of Example 22 | 4 | 4 | 4 | 2 |
| Example 79 | Product of Example 23 | 4 | 4 | 4 | 3 |
| Example 80 | Product of Example 24 | 3 | 2 | 2 | 4 |
| Example 81 | Product of Example 25 | 4 | 4 | 3 | 3 |
| Example 82 | Product of Example 26 | 3 | 2 | 2 | 3 |
| Example 83 | Product of Example 27 | 4 | 4 | 4 | 3 |
| Example 84 | Product of Example 28 | 3 | 2 | 2 | 3 |
| Comp. Ex. 29 | Product of Comp. Ex. 1 | 1 | 1 | 1 | 2 |
| Comp. Ex. 30 | Product of Comp. Ex. 2 | 3 | 2 | 2 | 1 |
| Comp. Ex. 31 | Product of Comp. Ex. 3 | 1 | 1 | 1 | 2 |
| Comp. Ex. 32 | Product of Comp. Ex. 4 | 4 | 4 | 4 | 1 |
| Comp. Ex. 33 | Product of Comp. Ex. 5 | 4 | 4 | 4 | 5 |
| Comp. Ex. 34 | Product of Comp. Ex. 6 | 1 | 1 | 1 | 1 |
| Comp. Ex. 35 | Product of Comp. Ex. 7 | 4 | 4 | 4 | 1 |
| Comp. Ex. 36 | Product of Comp. Ex. 8 | 1 | 1 | 1 | 2 |
| Comp. Ex. 37 | Product of Comp. Ex. 9 | 3 | 2 | 1 | 1 |
| Comp. Ex. 38 | Product of Comp. Ex. 10 | 1 | 1 | 1 | 1 |
| Comp. Ex. 39 | Product of Comp. Ex. 11 | 4 | 4 | 4 | 1 |
| Comp. Ex. 40 | Product of Comp. Ex. 12 | 4 | 4 | 4 | 4 |
| Comp. Ex. 41 | Product of Comp. Ex. 13 | 1 | 1 | 1 | 1 |
| Comp. Ex. 42 | Product of Comp. Ex. 14 | 4 | 4 | 3 | 1 |

EXAMPLE 85

200 g of the food additive slurry composition prepared by Example 2, 2.4 Kg of a commercially available cow's milk, 150 g of butter, 1.25 kg of defatted milk were added into 5 kg of water and homonized with stirring. After being sterilized and cooled by a normal method, 200 g of a starter preliminarily prepared were inculated into the mixture, filled into a 180 cc cup, and fermented at 38° C. for 5 hours to thus obtain a calcium-enriched yogurt.

The sensory test was conducted by 10 men and women and eating impression was evaluated by the following 4-rank criteria and flavor was evaluated by the following 5-rank criteria, the average values of which are shown in Table 7.

(Eating impression)

Texture is not only good, but tongue touch feel is good :4
Viscosity is somewhat high or texture is somewhat rough, and tongue touch feel is a little harsh :3
Viscosity is fairly high or texture is fairly rough, and tongue touch feel is fairly harsh :2
Viscosity is too high, water is released and tongue touch feel is very harsh :1

(Flavor)

Flavor is good :5
Flavor is slightly concerned about (Incongruity is somewhat felt.):4
Flavor is slightly bad (Unpleasantness is somewhat felt.) :3
Flavor is considerably bad (Unpleasantness is considerably felt.) :2
Flavor is vely bad (Unpleasantness is strongly felt.) :1

EXAMPLES 86 TO 88, COMPARATIVE EXAMPLES 43 TO 46

Calcium-enriched yogurts were obtained in the same manner as in Example 85, except that the food additive slurry compositions or the re-dispersed suspensions of the food additive powder compositions prepared by Examples 4, 16, 18, Comparative Examples 3, 4, 10, 11 were used and that each calcium agent concentration was adjusted to the same concentration as in Example 85. The seosory test was performed in the same manner as in Example 85. The results are shown in Table 7.

EXAMPLE 89

25 g of the food additive slurry composition prepared by Example 12, 2.4 Kg of a commercially available cow's milk, 150 g of butter, 1.35 kg of defatted milk were added into 5 kg of water and homonized with stirring. After being sterilized and cooled by a normal method, 200 g of a starter preliminarily prepared were inculated into the mixture, filled into a 180 cc cup, and fermented at 38° C. for 5 hours to thus obtain an iron-enriched yogurt. The seosory test was performed in the same manner as in Example 85. The results are shown in Table 7.

EXAMPLES 90 TO 94, COMPARATIVE EXAMPLES 47 TO 50

Iron-enriched yogurts were obtained in the same manner as in Example 89, except that the food additive slurry compositions or the re-dispersed suspensions of the food additive powder compositions prepared by Examples 13, 14, 26 to 28, Comparative Examples 6, 7, 13 and 14 were used and that each iron agent concentration was adjusted to the same concentration as in Example 89. The seosory results were performed in the same manner as in Example 85. The results are shown in Table 7.

|  | Slurry comp. or re-dispersed suspension of powder comp. | Eating impression | Flavor |
| --- | --- | --- | --- |
| Example 85 | Product of Example 2 | 4 | 5 |
| Example 86 | Product of Example 4 | 4 | 5 |
| Example 87 | Product of Example 16 | 4 | 4 |
| Example 88 | Product of Example 18 | 4 | 5 |
| Comp. Ex. 43 | Product of Comp. Ex. 3 | 1 | 2 |
| Comp. Ex. 44 | Product of Comp. Ex. 4 | 1 | 1 |
| Comp. Ex. 45 | Product of Comp. Ex. 10 | 1 | 2 |
| Comp. Ex. 46 | Product of Comp. Ex. 11 | 1 | 1 |
| Example 89 | Product of Example 12 | 4 | 5 |
| Example 90 | Product of Example 13 | 2 | 3 |
| Example 91 | Product of Example 14 | 3 | 3 |
| Example 92 | Product of Example 26 | 4 | 4 |
| Example 93 | Product of Example 27 | 2 | 2 |
| Example 94 | Product of Example 28 | 2 | 3 |
| Comp. Ex. 47 | Product of Comp. Ex. 6 | 2 | 2 |
| Comp. Ex. 48 | Product of Comp. Ex. 7 | 1 | 1 |
| Comp. Ex. 49 | Product of Comp. Ex. 13 | 1 | 1 |
| Comp. Ex. 50 | Product of Comp. Ex. 14 | 1 | 1 |

As explained above, the food additive slurry or powder compositions are superior not only in re-dispersibility in liquid, dispersion stability in liquid for a long period of time and flavor, but are capable of providing highly concentrated products, and therefor they are advantageous economically. Moreover, food compositions prepared by the use of the food additive slurry or powder compositions are very excellent in storage stability for a long period of time even in neutral or acidic region.

What is claimed is:

1. A food additive slurry composition which comprises water, 100 parts by weight of at least one agent (A) selected from the group consisting of (i) a calcium agent consisting of calcium carbonate or calcium phosphate, and (ii) an iron agent consisting of ferric pyrophosphate, and 1 to 60 parts by weight of gum arabic (B), wherein a calcium ion concentration M (mg/l) of the food additive slurry satisfies the following requirement (a):

$$10 < M \leq 500 \quad (a)$$

wherein M means a calcium ion concentration of a food additive slurry obtained by adjusting a solid concentration of the food additive slurry to 10% by weight (mg/l) after pulverization and/or dispersion, and wherein a weight average diameter K ($\mu$m) in particle size distribution of the calcium agent and/or the iron agent contained in the food additive slurry composition is 0.04 $\mu$m $\leq$ K $\leq$ 0.8 $\mu$m.

2. A food additive slurry composition which comprises water, 100 parts by weight of at least one agent (A) selected from the group consisting of (i) a calcium agent consisting of calcium carbonate or calcium phosphate and (ii) an iron agent consisting of ferric pyrophosphate, and 1 to 60 parts by weight in total of gum arabic (B) component and an additive (C), component the content of the (B) component being not less than 20% by weight of the total amount of the components (B) and (C), and the (C) component comprising at least one selected from the group consisting of sucrose fatty acid ester having an HLB of not less that 8, polyglycerol fatty acid ester and polysaccharide, wherein a calcium ion concentration M (mg/l) of the food additive slurry satisfies the following requirement (a):

$$10 < M \leq 500 \quad (a)$$

wherein M means a calcium ion concentration of a food additive slurry obtained by adjusting a solid concentration of the food additive slurry to 10% by weight (mg/l) after pulverization and/or dispersion, and wherein a weight average diameter K ($\mu$m) in particle size distribution of the calcium agent and/or the iron agent contained in the food additive slurry composition is 0.04 $\mu$m≦K≦0.8 $\mu$m.

3. The food additive slurry composition of claim 2, wherein the additive (C) comprises at least one selected from the group consisting of sucrose fatty acid ester having an HLB of not less than 8, polyglycerol fatty acid ester, carboxymethyl cellulose, propylene glycol alginate, temarind gum, gum ghatti, traganth gum, xanthane gum, pullulan, cassia gum, locust bean gum, arabinogalactan and sclero gum.

4. The food additive slurry composition of claim 2, wherein the additive (C) is at least one selected from the group consisting of sucrose fatty acid ester having an HLB of not less than 8, propylene glycol alaginate, tamarind gum, gum ghatti, xanthane gum, pullulan, locust bean gum, arabinogalactan and sclero gum.

5. The food additive slurry composition of any one of claims 2 to 4, wherein the amount of the gum arabic (B) is 50 to 99.99% by weight of the total amount of the components (B) and (C).

6. The food additive slurry composition of claims 1 or 2, wherein the gum arabic is a desalted gum arabic.

7. The food additive slurry composition of claims 1 or 2, wherein a weight average diameter K ($\mu$m) in particle size distribution of the calcium agent and/or the iron agent contained in the food additive slurry composition is 0.04 $\mu$m≦K≦0.3 $\mu$m.

8. The food additive slurry composition of claims 1 or 2, wherein a solid concentration is not less than 30% by weight.

9. A food additive powder composition which is obtained by drying the food additive slurry composition defined in claims 1 or 2.

10. A food composition containing a food additive powder composition defined by claim 9.

11. A food composition containing a food additive slurry composition defined by claims 1 or 2.

12. The food additive slurry composition of claims 1 or 2, wherein the specific surface area of the calcium agent is from 6 to 60 m²/g.

13. A method for producing a food additive slurry composition which comprises carrying out at least one process selected from the group consisting of (D), (E) and (F):

(D) pulverizing and/or dispersing an aqueous suspension comprising at least one agent (A) selected from the group consisting of (i) a calcium agent consisting of calcium carbonate or calcium phosphate and (ii) an iron agent consisting of ferric pyrophosphate and water by a chemical dispersing process or a physical process using a pulverizer and/or a disperser, then adding gum arabic (B), or gum arabic (B) and an additive (C);

(E) pulverizing and/or dispersing an aqueous suspension comprising at least one agent (A) selected from the group consisting of (i) a calcium agent consisting of calcium carbonate or calcium phosphate ard (ii) an iron agent consisting of ferric pyrophosphate, gum arabic (B), or gum arabic (B) and an additive (C), and water by a chemical dispersing process or a physical process using a pulverizer and/or a disperser;

(F) pulverizing and/or dispersing by a chemical dispersing process or a physical process using a pulverizer ard or disperser, an aqueous suspension containing at least one agent (A) selected from the group consisting of (i) a calcium agent consisting of calcium carbonate or calcium phosphate and (ii) an iron agent consisting of ferric pyrophosphate, then adding gum arabic (B), or gum arabic (B) and an additive (C), thereafter pulverizing and/or dispersing the mixture by a physical process using pulverizer and/or disperser, wherein a calcium ion concentration M (mg/l) of the food addition slurry satisfies the following requirement (a):

$$10 < M \leq 500 \tag{a}$$

wherein M means a calcium ion concentration of a food additive slurry obtained by adjusting a solid concentration of the food additive slurry to 10% by weight (mg/l) after pulverization and/or dispersion, and wherein a weight average diameter K ($\mu$m) in particle size distribution of the calcium agent and/or the iron agent contained in the food additive slurry composition is 0.04 $\mu$m≦K≦0.8 $\mu$m.

14. The method of claim 13, wherein a calcium ion concentration M (mg/l) of the food additive slurry composition satisfies the following requirement (a), and the M, an amount J (parts by weight) of the gum arabic based on 100 parts by weight of the calcium agent, and a weight average diameter K ($\mu$m) in particle size distribution of the calcium agent in the food additive slurry satisfy the following requirement (b):

$$10 < M \leq 500 \tag{a}$$

$$L = \frac{J \times M}{3.14 \times K^2 \times 10000} \tag{b}$$

$$0.035 \leq L \leq 350$$

* * * * *